United States Patent
Kuerschner et al.

(10) Patent No.: US 10,003,217 B2
(45) Date of Patent: Jun. 19, 2018

(54) SYSTEM AND METHOD FOR REDUCING EMISSIONS FOR POLARIZED COIL SYSTEMS FOR WIRELESS INDUCTIVE POWER TRANSFER

(71) Applicant: QUALCOMM Incorporated, San Diego, CA (US)

(72) Inventors: Daniel Kuerschner, Kamen (DE); Michael Werner, Markt Schwaben (DE)

(73) Assignee: QUALCOMM Incorporated, San Diego, CA (US)

(*) Notice: Subject to any disclaimer, the term of this patent is extended or adjusted under 35 U.S.C. 154(b) by 245 days.

(21) Appl. No.: 14/464,567

(22) Filed: Aug. 20, 2014

(65) Prior Publication Data

US 2015/0255993 A1    Sep. 10, 2015

Related U.S. Application Data

(60) Provisional application No. 61/947,919, filed on Mar. 4, 2014.

(51) Int. Cl.
*H02J 7/00*    (2006.01)
*H02J 7/02*    (2016.01)
(Continued)

(52) U.S. Cl.
CPC ............ *H02J 50/10* (2016.02); *B60L 11/182* (2013.01); *H01F 38/14* (2013.01); *H02J 5/005* (2013.01);
(Continued)

(58) Field of Classification Search
CPC ... H02J 5/00; H02J 5/005; H02J 17/00; B60L 11/182; B60L 11/1829; B60L 11/1833; B60L 2230/10; B60L 2270/147; B60L 1/00; Y02T 90/122; Y02T 10/7072; Y02T 90/14; Y02T 10/7005; H04B 5/0037; H01F 38/14
See application file for complete search history.

(56) References Cited

U.S. PATENT DOCUMENTS

2012/0098486 A1*  4/2012  Jung ................ H02J 7/025
                                                      320/108
2012/0187903 A1    7/2012  Tabata et al.
(Continued)

FOREIGN PATENT DOCUMENTS

CN    103107008 A    5/2013
CN    101522460 B    7/2013
(Continued)

OTHER PUBLICATIONS

International Search Report and Written Opinion—PCT/US2015/016644—ISA/EPO—dated Sep. 18, 2015.

*Primary Examiner* — Son Le
(74) *Attorney, Agent, or Firm* — Knobbe, Martens, Olson & Bear, LLP

(57) ABSTRACT

This disclosure includes systems, methods and apparatus for reducing emissions for polarized coil systems for wireless inductive power transfer. In one aspect, a magnetic flux device is provided which includes at least a first electrically conductive coil and a second electrically conductive coil that is substantially coplanar with the first coil. The device includes a magnetically permeable material having a substantially planar surface. The first coil and the second coil are substantially parallel to the substantially planar surface. The area of the material extends beyond the area of the first coil and beyond the area of the second coil. The area of the coil can substantially surround the area of the first coil and the area of the second coil.

21 Claims, 16 Drawing Sheets

(51) Int. Cl.
  *H02J 5/00* (2016.01)
  *H02J 50/10* (2016.01)
  *H02J 50/60* (2016.01)
  *H02J 50/80* (2016.01)
  *H02J 50/90* (2016.01)
  *H02J 50/12* (2016.01)
  *H02J 50/40* (2016.01)
  *B60L 11/18* (2006.01)
  *H01F 38/14* (2006.01)

(52) U.S. Cl.
  CPC .............. *H02J 7/025* (2013.01); *H02J 50/12* (2016.02); *H02J 50/40* (2016.02); *H02J 50/60* (2016.02); *H02J 50/80* (2016.02); *H02J 50/90* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2013/0119779 A1 | 5/2013 | Jung et al. |
| 2013/0270921 A1* | 10/2013 | Boys .................. H01F 38/14 307/104 |
| 2013/0342162 A1 | 12/2013 | Tabata et al. |
| 2014/0070764 A1 | 3/2014 | Keeling |
| 2015/0091519 A1* | 4/2015 | Komma .............. B60L 11/1833 320/108 |
| 2015/0170832 A1* | 6/2015 | Covic .................. H01F 27/38 307/104 |

FOREIGN PATENT DOCUMENTS

| | | |
|---|---|---|
| EP | 2595162 A2 | 5/2013 |
| WO | WO-2010090539 A1 | 8/2010 |
| WO | WO-2013019122 A1 | 2/2013 |
| WO | WO-2014011059 A1 | 1/2014 |
| WO | WO-2014070443 A2 | 5/2014 |

\* cited by examiner

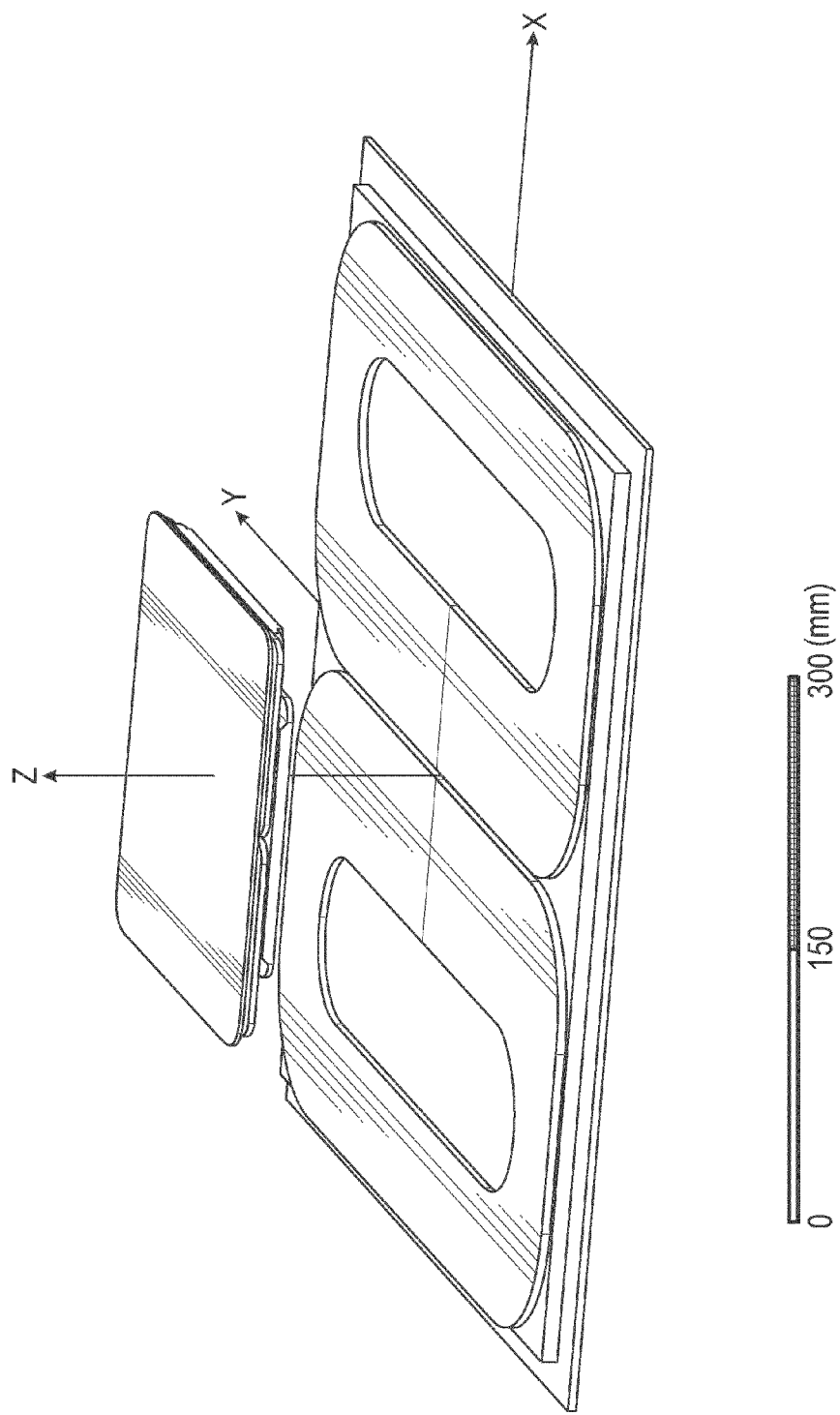

SYSTEM AND METHOD FOR REDUCING EMISSIONS FOR POLARIZED COIL SYSTEMS FOR WIRELESS INDUCTIVE POWER TRANSFER

RELATED APPLICATION

This application claims the benefit of priority to U.S. Provisional Appl. No. 61/947,919, filed Mar. 4, 2014, and incorporated in its entirety by reference herein.

FIELD

The present disclosure relates generally to wireless power transfer, and more specifically to devices, systems, and methods related to wireless power transfer to remote systems such as electric vehicles, and coupler coil configurations.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure includes a magnetic flux device configured to transmit magnetic flux to or to receive magnetic flux from a space beyond the device. The device comprises at least a first electrically conductive coil and a second electrically conductive coil. The first coil is substantially planar, has a first inner periphery bounding a first region, and has a first outer periphery bounding a first area. The first outer periphery has at least one substantially straight first portion. The second coil is substantially planar, has a second inner periphery bounding a second region, and has a second outer periphery bounding a second area. The second outer periphery has at least one substantially straight second portion. The second coil is substantially coplanar with the first coil. The device further comprises a magnetically permeable material (e.g., core) having a substantially planar surface and having a third outer periphery bounding a third area. The first coil and the second coil are substantially parallel to the substantially planar surface. The third area extends beyond the first area along the at least one substantially straight first portion and beyond the second area along the at least one substantially straight second portion. The magnetically permeable material is substantially overlaying the first region and substantially overlaying the second region. Another aspect of the disclosure includes an inductive power transfer system comprising a magnetic flux device as recited above. Another aspect of the disclosure includes a method of transmitting magnetic flux to or receiving magnetic flux from a space beyond a magnetic flux device as recited above. The method comprises using a magnetic flux device to transmit magnetic flux or to receive magnetic flux from a space beyond the magnetic flux device, the magnetic flux device as recited above.

Another aspect of the disclosure includes a magnetic flux device configured to transmit magnetic flux to or to receive magnetic flux from a space beyond the device. The device comprises at least a first electrically conductive coil and a second electrically conductive coil. The first coil is substantially planar and has a first outer periphery bounding a first area. The second coil is substantially planar and has a second outer periphery bounding a second area. The second coil is substantially coplanar with the first coil. The device further comprises a magnetically permeable material (e.g., core) having a substantially planar surface and having a third outer periphery bounding a third area. The first coil and the second coil are substantially parallel to the substantially planar surface. The third area extends beyond the first area and the second area, and the third area substantially surrounds the first area and the second area. Another aspect of the disclosure includes an inductive power transfer system comprising a magnetic flux device as recited above. Another aspect of the disclosure includes a method of transmitting magnetic flux to or receiving magnetic flux from a space beyond a magnetic flux device as recited above. The method comprises using a magnetic flux device to transmit magnetic flux or to receive magnetic flux from a space beyond the magnetic flux device, the magnetic flux device as described above.

Another aspect of the disclosure includes a magnetic flux device configured to transmit magnetic flux to or to receive magnetic flux from a space beyond the device. The device comprises first means for transmitting magnetic flux or receiving magnetic flux. The first means is substantially planar, has a first outer periphery bounding a first area, has a first inner periphery bounding a first region, and has at least one substantially straight first portion. The device further comprises second means for transmitting magnetic flux or receiving magnetic flux. The second means is substantially planar, has a second outer periphery bounding a second area, has a second inner periphery bounding a second region, and has at least one substantially straight second portion. The second means is substantially coplanar with the first means. The device further comprises third means for affecting the magnetic flux transmitted or received by the first means and the second means. The third means has a substantially planar surface and has a third outer periphery bounding a third area. The first means and the second means are substantially parallel to the substantially planar surface. The third area extends beyond the first area along the at least one substantially straight first portion and beyond the second area along the at least one substantially straight second portion. The third means is substantially overlaying the first region and substantially overlaying the second region.

Another aspect of the disclosure includes a magnetic flux device configured to transmit magnetic flux to or to receive magnetic flux from a space beyond the device. The device comprises first means for transmitting magnetic flux or receiving magnetic flux. The first means is substantially planar and has a first outer periphery bounding a first area. The device further comprises second means for transmitting magnetic flux or receiving magnetic flux. The second means is substantially planar and has a second outer periphery bounding a second area. The second means is substantially coplanar with the first means. The device further comprises third means for affecting the magnetic flux transmitted or received by the first means and the second means. The third means has a substantially planar surface and has a third outer periphery bounding a third area. The first means and the second means are substantially parallel to the substantially planar surface. The third area extends beyond and substantially surrounds the first area and the second area.

BRIEF DESCRIPTION OF THE DRAWINGS

FIG. 8 schematically illustrates an example "Double-D" coil configuration of a base pad below a vehicle pad.

Figure 1:
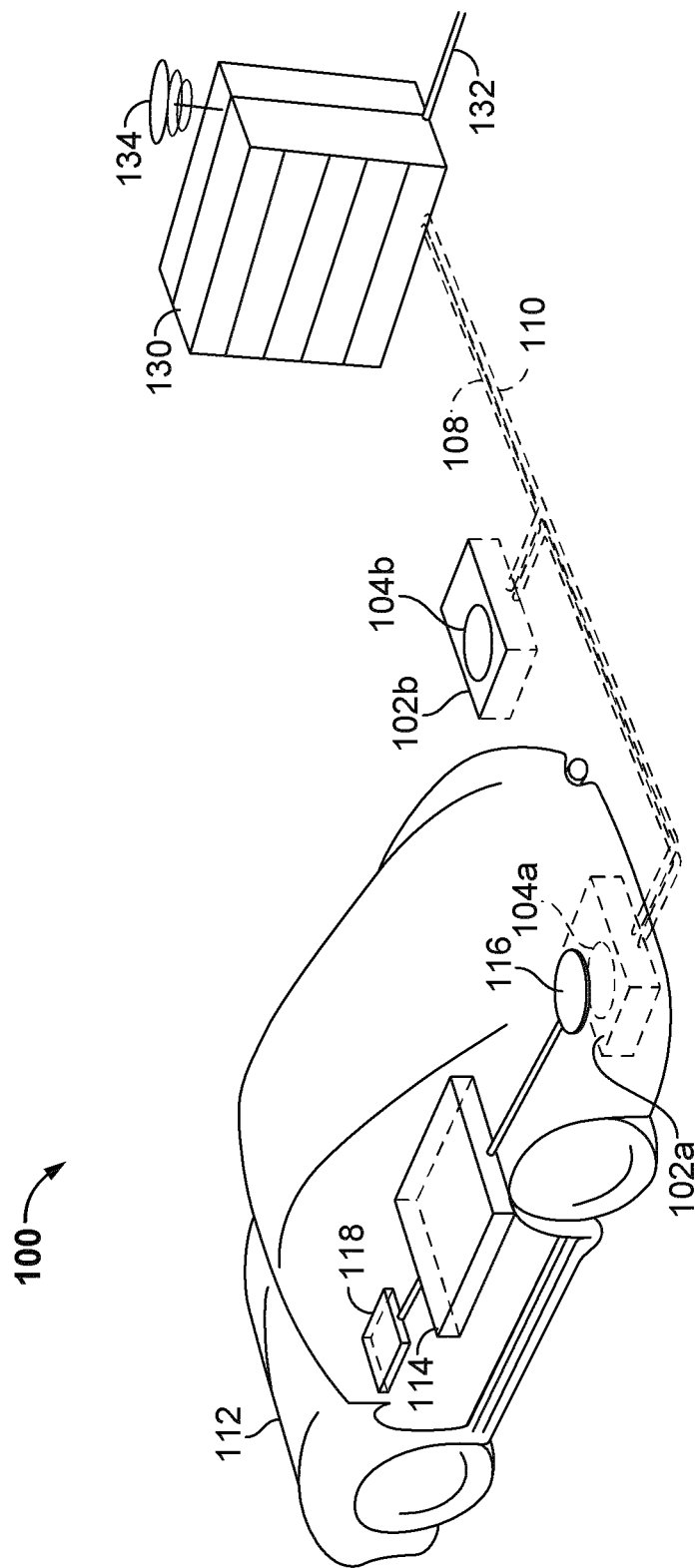
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
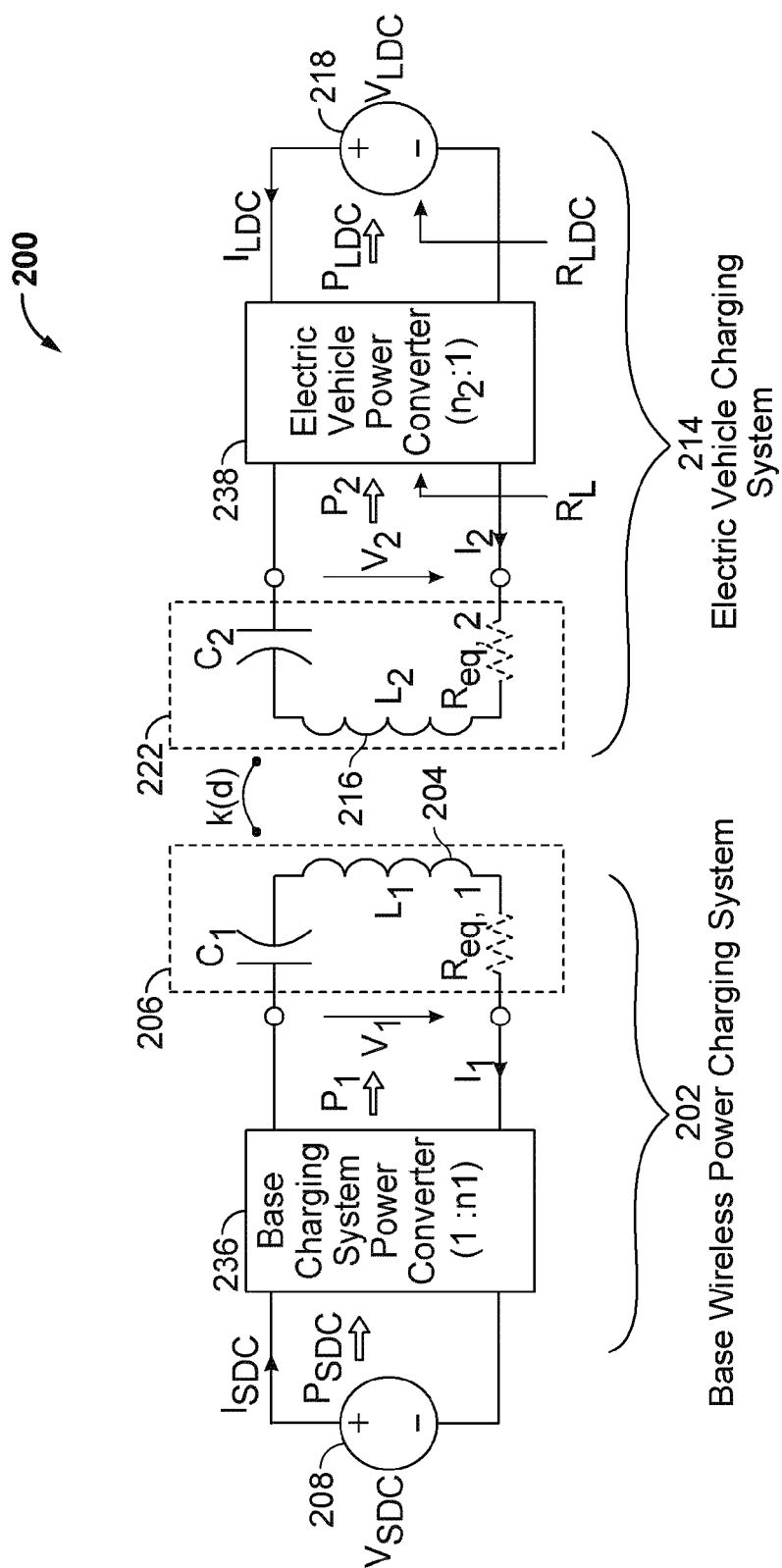
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may be become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
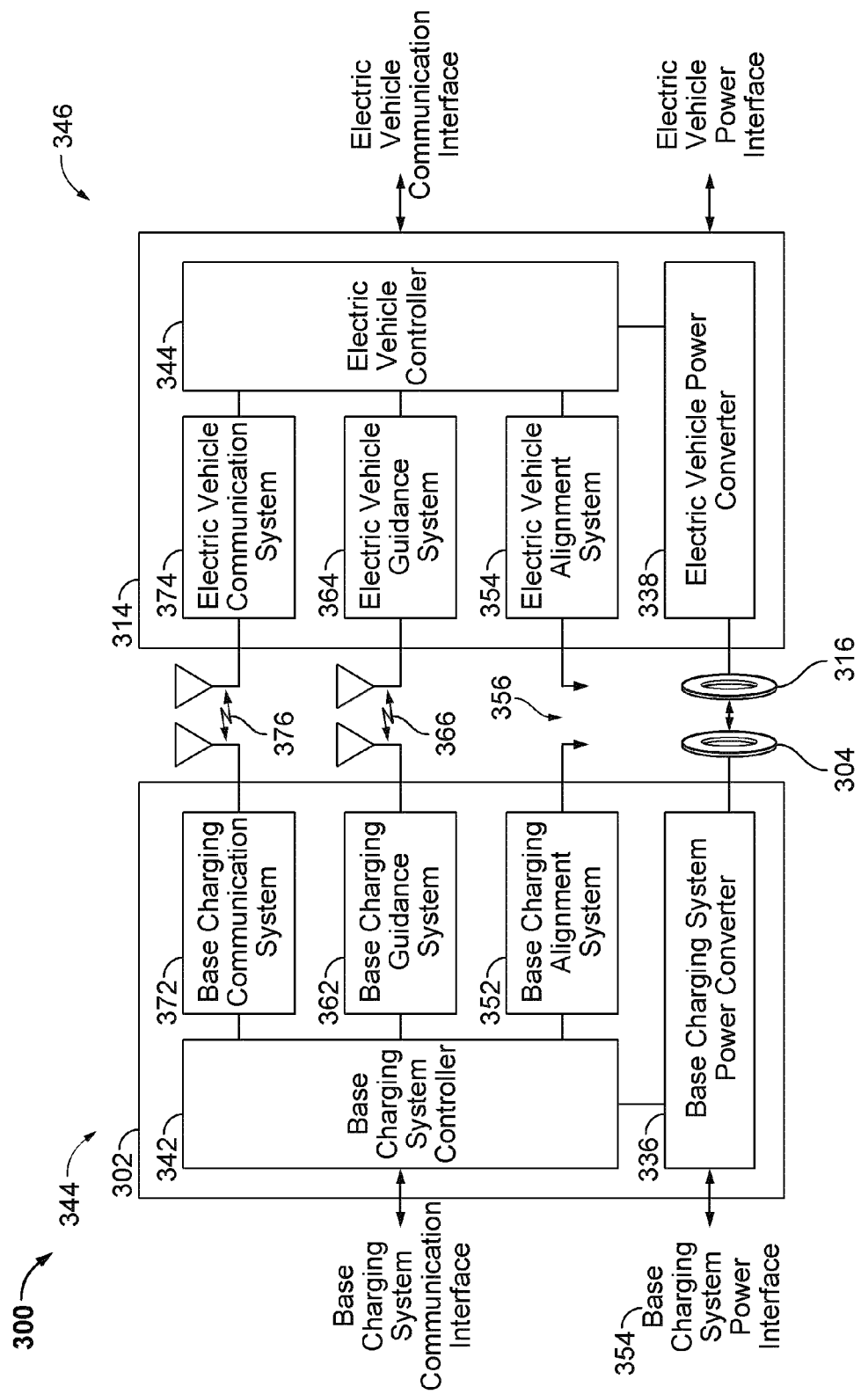
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
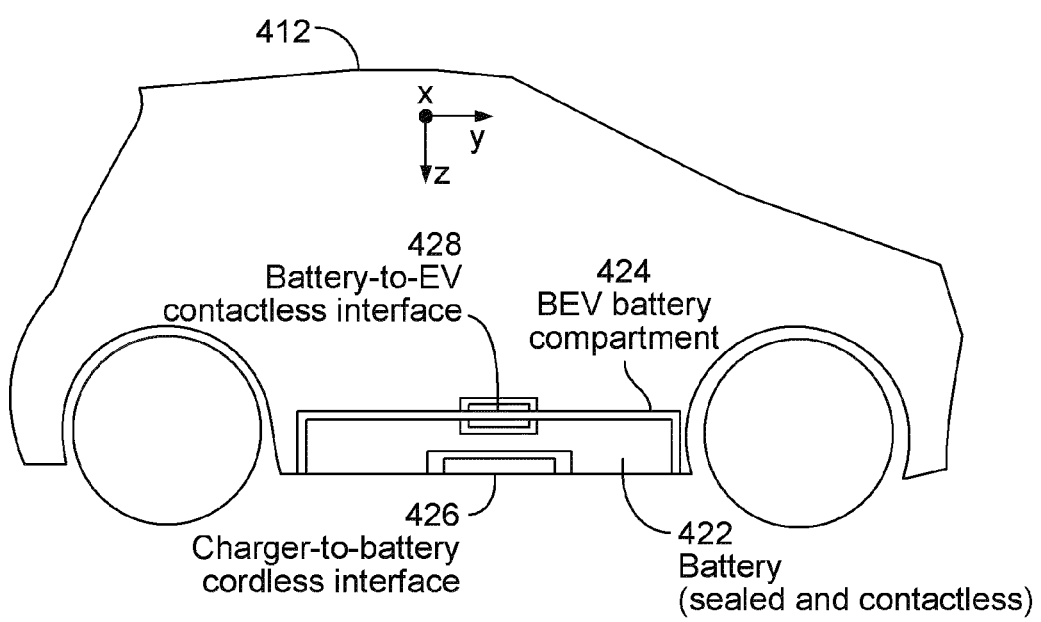
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
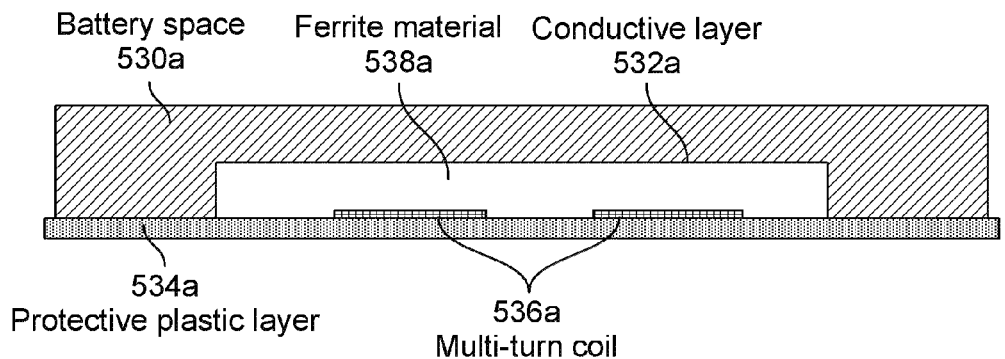
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
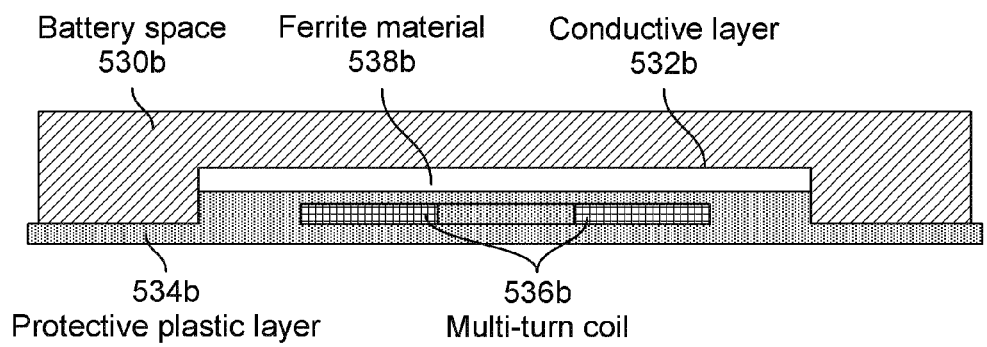

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
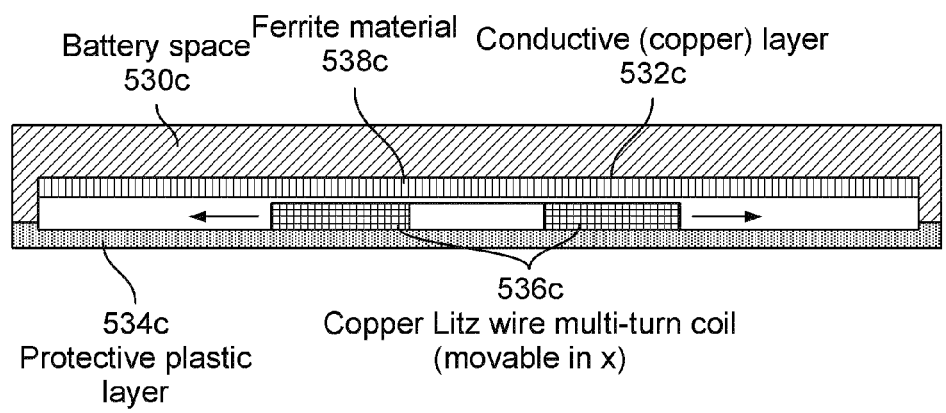
Figure 5D:
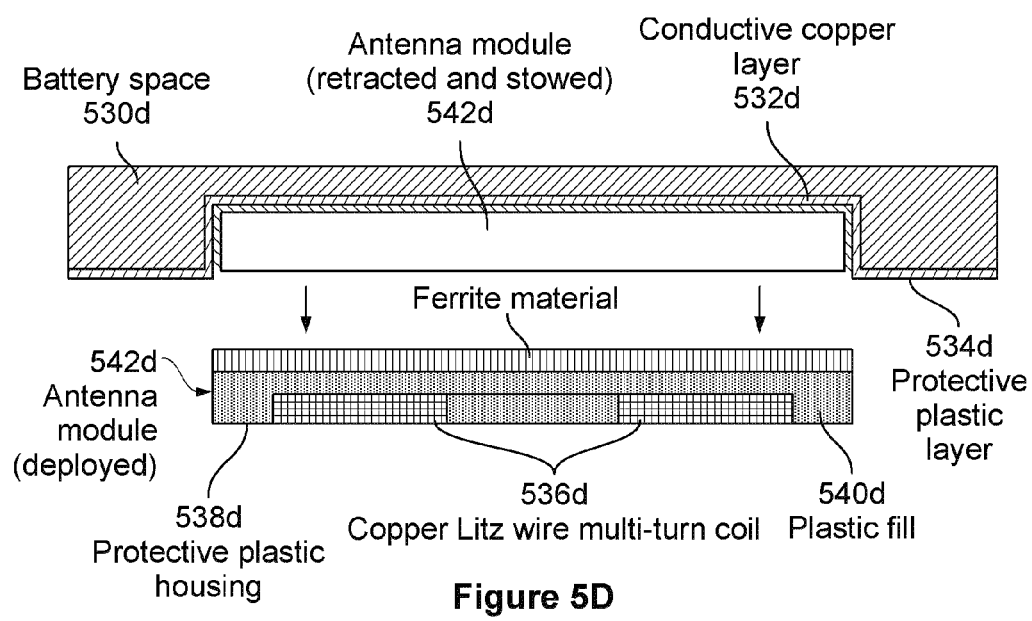

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
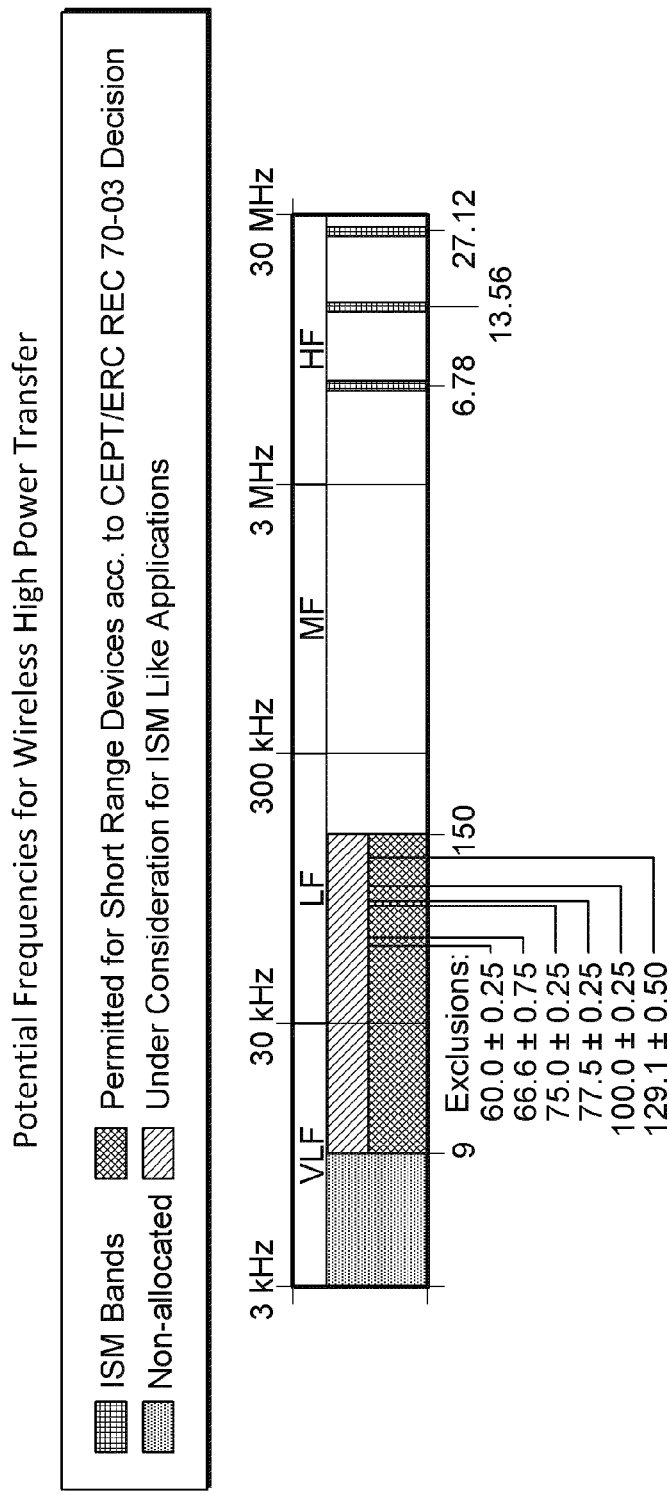
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
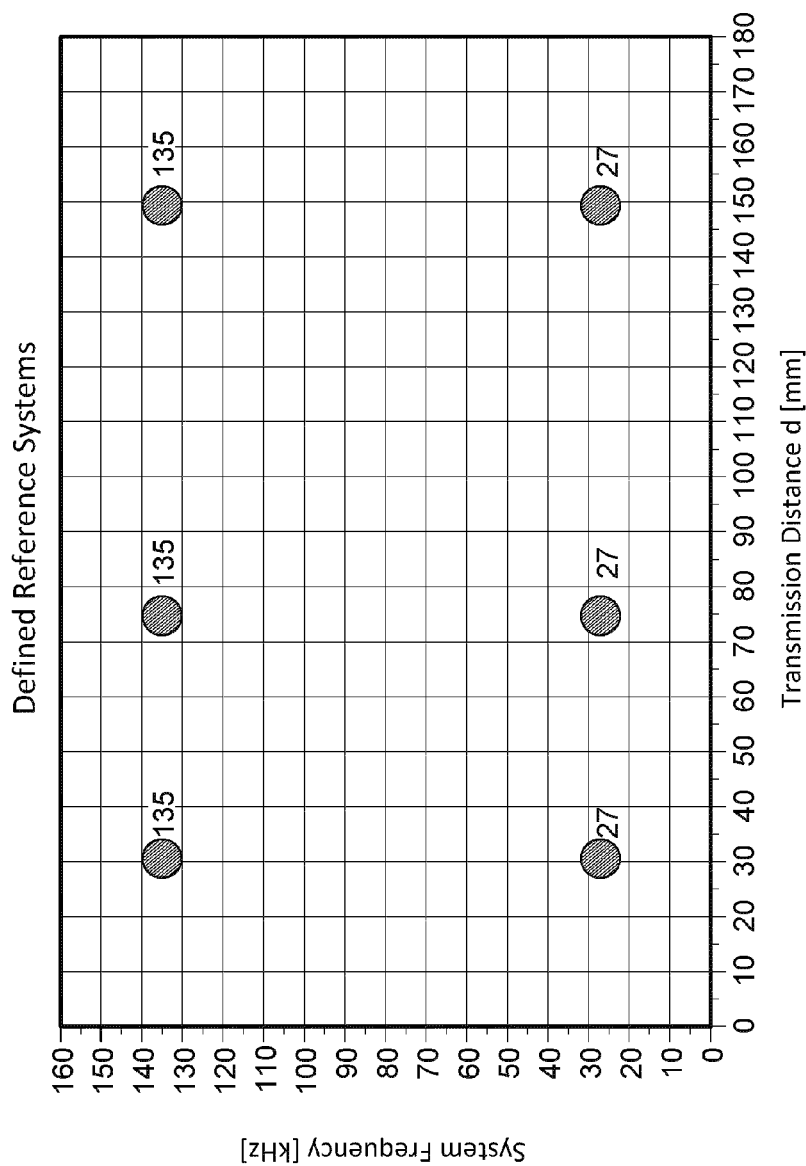
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

Wireless electric vehicle charging (WEVC) systems can use various coupler coil configurations. For example, a polarized coil configuration, so-called "Double D" coil design, has been previously disclosed. However, disadvantages of some implementations of "Double D" coil structures include high emissions of the magnetic flux density and high power loss in the shield layers. FIG. 8 schematically illustrates an example "Double-D" coil configuration of a base pad below a vehicle pad. The "Double-D" coil configuration comprises two planar coils and a planar ferrite pad below the two planar coils and substantially parallel to the two coils. The outer periphery of each coil is substantially aligned with the outer periphery of the ferrite pad (e.g., along the straight portions of the outer peripheries of the first coil and the second coil that are perpendicular to the x-axis or to the y-axis).

Certain embodiments described herein provide configurations in which the base pad structure is optimized (e.g., the structure of the ferrite layer) such that the emissions and power loss are significantly reduced without a significant negative influence on the energy transfer (e.g., magnetic coupling) provided by the coil configuration. For example, certain embodiments described herein can be used to optimize pad structures having the "DD-coil" configuration (e.g., as shown in FIG. 9A) and pad structures having the "bipolar-coil" configuration (e.g., as shown in FIG. 9B) such that the emissions and power loss are significantly reduces without a significant negative influence on the energy transfer (e.g., magnetic coupling) provided by the coil configuration.

Figure 9A:
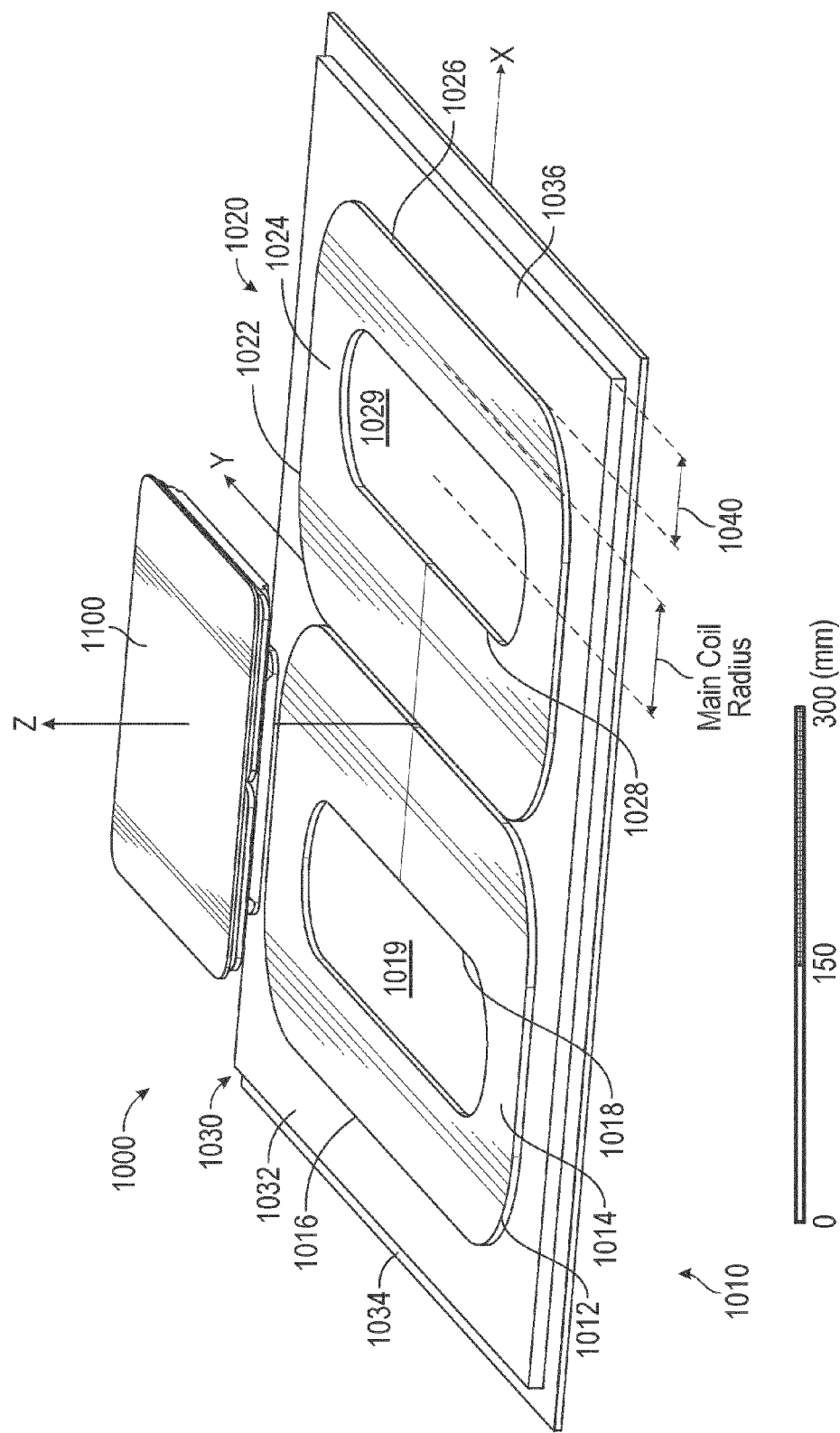
FIG. 9A schematically illustrates an example magnetic flux device having two coils that do not extend over one another in which the magnetically permeable material extends beyond the area beneath the two coils in accordance with certain embodiments described herein.
Figure 9B:
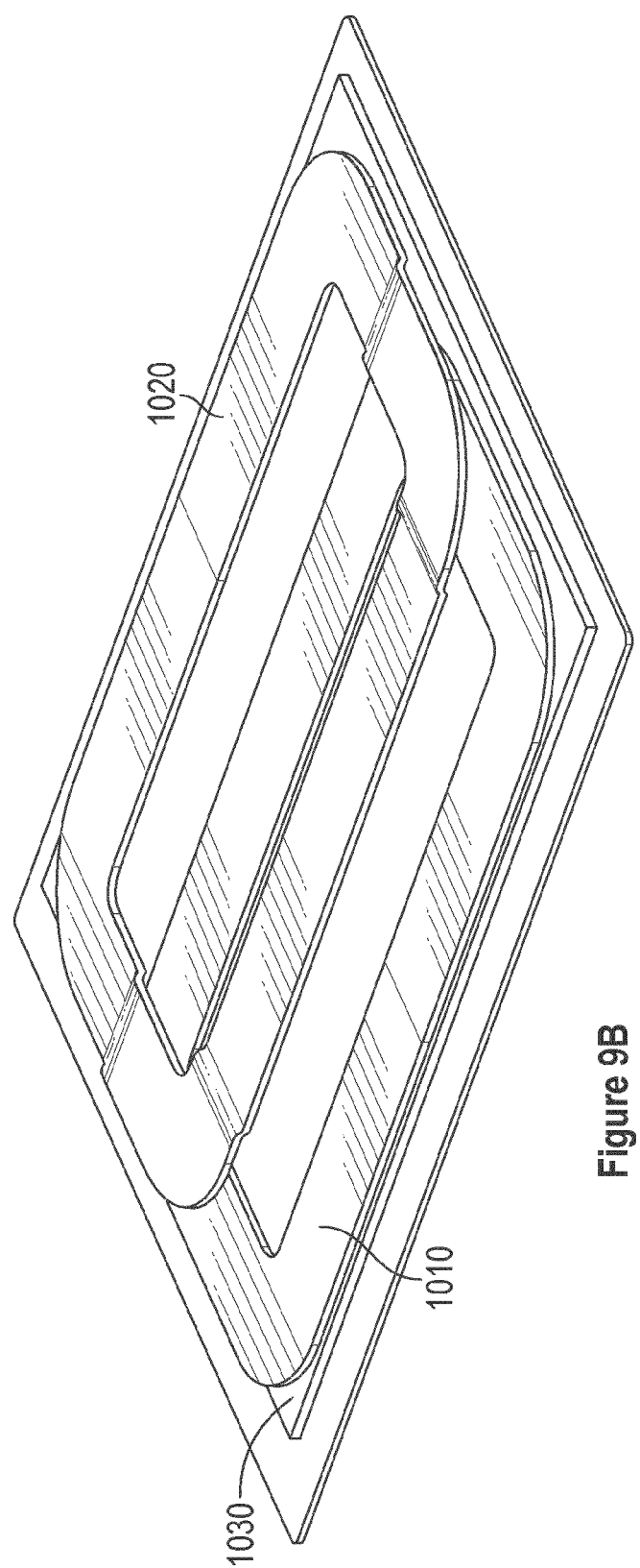
FIG. 9B schematically illustrates an example magnetic flux device having two coils that do extend partially over one another but with the magnetically permeable material not extending appreciably beyond the area beneath the two coils.

FIG. 9A schematically illustrates an example magnetic flux device 1000 having two coils 1010, 1020 that do not extend over one another in which the magnetically permeable material 1030 (e.g., core) extends beyond the area beneath the two coils 1010, 1020 in accordance with certain embodiments described herein and FIG. 9B schematically illustrates an example magnetic flux device having two coils 1010, 1020 that do extend partially over one another but with the material 1030 not extending appreciably beyond the area beneath the two coils 1010, 1020. The example magnetic flux device of FIG. 9B can have the material 1030 extend beyond the area beneath the two coils 1010, 1020, thereby providing another example magnetic flux device 1000 in accordance with certain embodiments described herein. The device 1000 is configured to transmit magnetic flux to or to receive magnetic flux from a space beyond the device 1000. The device 1000 can be part of an inductive power transfer system. For example, the device 1000 can be a base pad configured to wirelessly transfer power to a vehicle pad of an electric vehicle (e.g., a vehicle pad 1100). As used herein, the term "magnetic flux device" has its broadest reasonable interpretation, including but not limited to, a base pad, a vehicle pad, or other type of magnetic flux pad, and is not restricted to any particular shape, dimensions, or combination of components. As used herein, the term "pad" has its broadest reasonable interpretation, including but not limited to, a device (e.g., a base pad, a vehicle pad) configured for use in a wireless electric vehicle charging system, and is not restricted to any particular shape, dimensions, or combination of components. The device 1000 comprises at least a first electrically conductive coil 1010 and a second electrically conductive coil 1020. The first coil 1010 is substantially planar and has a first outer periphery 1012. The second coil 1020 is substantially planar and has a second outer periphery 1022. The second coil 1020 is substantially coplanar with the first coil 1010. For the example device 1000 schematically shown in FIG. 9A, the first coil 1010 and the second coil 1020 do not extend over one another, so a first area 1014 bounded by the first outer periphery 1012 and a second area 1024 bounded by the second outer periphery 1022 do not extend over one another. For an example device 1000 having the first coil 1010 and the second coil 1020 partially extending over one another (e.g., as schematically shown in FIG. 9B), the first area 1014 bounded by the first outer periphery 1012 and the second area 1024 bounded by the second outer periphery 1022 do partially extend over one another (e.g., the second coil 1020 extending partially over the first coil 1010). In regions where the two coils 1010, 1020 partially extend over one another, the first coil 1010 is substantially planar and the second coil 1020 is substantially planar, with one or both of the coils 1010, 1020 deviating slightly from being completely planar to accommodate the coil thickness. While FIG. 9B shows the second coil 1020 bent, in other implementations, one or both of the first coil 1010 and the second coil 1020 are not bent.

The device 1000 further comprises a magnetically permeable material (e.g., core) 1030 (e.g., comprising a ferrite plate) having a substantially planar surface 1032 and having a third outer periphery 1034 bounding a third area 1036. The magnetically permeable material 1030 is sometimes referred to as a "core." As used herein, the term "core" has its broadest reasonable interpretation, which in particular, is not limited to being in a central location or being wrapped around by other components. The material 1030 can be magnetically associated with at least the first coil 1010 and the second coil 1020. The first coil 1010 and the second coil 1020 are substantially parallel to the substantially planar surface 1032. For an example device 1000 having one or more regions where the two coils 1010, 1020 partially extend over one another (e.g., as schematically shown in FIG. 9B), one or both of the coils 1010, 1020 deviate slightly from being completely parallel to the substantially planar surface 1032 to accommodate the coil thickness. As schematically illustrated by FIG. 9A, the first coil 1010 can be on a first half of the surface 1032 and the second coil 1020 can be on a second half of the surface 1032.

An area bounded by the sum of the first outer periphery 1012 and the second outer periphery 1022 can be less than the third area 1036. For the example device 1000 schematically shown in FIG. 9A, the sum of the first area 1014 ("$A_1$") and the second area 1024 ("$A_2$") can be less than the third area 1036 ("$A_3$") (e.g., $A_1+A_2<A_3$). For an example device 1000 having one or more regions where the two coils 1010, 1020 partially extend over one another (e.g., as schematically shown in FIG. 9B), the sum of the first area 1014 and the second area 1024, minus the portion ("$A_{over}$") of the second area 1024 extending over the first area 1014, can be less than the third area 1036 (e.g., $A_1+A_2-A_{over}<A_3$). The outer horizontal dimension of the sum of the first coil 1010 and the second coil 1020 can be less than an outer horizontal dimension of the material 1030.

In certain embodiments, the first coil 1010 and the second coil 1020 (e.g., as shown in FIGS. 9A and 9B) can be in a polarized coil configuration and can be driven such that two poles are formed substantially in the first area 1014 and the second area 1024, respectively. In one operational mode, flux exits from one pole and enters the other pole to generate a substantially horizontal flux (e.g., flux in a direction parallel to the plane of the co-planar coils) in an area above the device 1000. In certain such embodiments, the coils 1010, 1020 are driven such that current in the adjacent inner portions of the first coil 1010 and the second coil 1020 are in the same direction.

In certain embodiments, the first coil 1010 is a spiral wound coil and the second coil 1020 is a spiral wound coil, and in certain other embodiments, the first coil 101 and the second coil 1020 are formed by a single conductive wire wound to form the two coils. The first coil 1010 can be adjacent to the material 1030 and the second coil 1020 can be adjacent to the material 1030. The first outer periphery 1012 can be adjacent to the second outer periphery 1022 (as shown schematically in FIG. 9A), or the first outer periphery 1012 and the second outer periphery 1022 can extend partially over one another (as shown schematically in FIG. 9B).

In certain embodiments, the first outer periphery 1012 of the first coil 1010 has at least one substantially straight first portion 1016, and the second outer periphery 1022 of the second coil 1020 has at least one substantially straight second portion 1026. The third area 1036 can extend beyond the first area 1014 along the at least one substantially straight first portion 1016 and beyond the second area 1024 along the at least one substantially straight second portion 1026. The at least one substantially straight first portion 1016 can extend along a first direction and the at least one substantially straight second portion 1026 can extend along a second direction substantially parallel to the first direction. The third area 1036 can extend beyond the first area 1014 in at least two directions perpendicular to one another and the third area 1036 can extend beyond the second area 1024 in the at least two directions. In certain embodiments, the third area 1036 extends beyond the first area 1014 and the second area 1024 and substantially surrounds the first area 1014 and the second area 1024.

FIG. 9A shows a pair of lines denoting the "overlap" dimension 1040 (e.g., distance between the third outer periphery 1034 and the second outer periphery 2016). While FIG. 9B does not show such an "overlap" dimension 1040, the sizes of the first coil 1010, the second coil 1020, and the material 1030 of FIG. 9B can be modified to produce such an "overlap" dimension 1040. The third area 1036 can extend beyond the first area 1014 by a distance in a range between 5% of the main coil radius of either the first coil 1010 or the second coil 1020 and 20% of the overall device size (e.g., the distance between the extreme portions of the third outer periphery 1034). The third area 1036 can extend beyond the second area 1024 by a distance in a range between 5% of the main coil radius of either the first coil 1010 or the second coil 1020 and 20% of the overall device size (e.g., the distance between the extreme portions of the third outer periphery 1034). The third outer periphery 1034 can be spaced from the first outer periphery 1012 and from the second outer periphery 1022 in at least two orthogonal directions substantially parallel to the first coil 1010 and the second coil 1020 by a distance in a range between 5% of the main coil radius of either the first coil 1010 or the second coil 1020 and 20% of the overall device size (e.g., the distance between the extreme portions of the third outer periphery 1034). As used herein, the phrase "main coil radius" of a coil refers to the average coil radius of the coil in the polarization direction of the device, and the phrase "polarization direction" refers to the direction from the center of the first coil 1010 to the center of the second coil 1020 (e.g., the x-direction in FIG. 9A). For example, as shown schematically in FIG. 9A, the second coil 1020 has an inner coil radius in the polarization direction and an outer coil radius in the polarization direction, and the main coil radius of the second coil 1020 is the average of the inner coil radius and the outer coil radius of the second coil 1020 in the polarization direction (denoted by the arrow overlaid onto the second coil 1020).

For example, for coils having a main coil radius of 80 millimeters and an overall pad size of 250 mm, the third area 1036 can extend beyond the first area 1014 by a distance in a range between 4 millimeters and 50 millimeters (e.g., 20 millimeters) and can extend beyond the second area 1020 by a distance in a range between 4 millimeters and 50 millimeters (e.g., 20 millimeters). The third outer periphery 1034 can be spaced from the first outer periphery 1012 and from the second outer periphery 1022 in at least two orthogonal directions substantially parallel to the first coil 1010 and the second coil 1020 by a distance in a range between 4 millimeters and 50 millimeters (e.g., 20 millimeters).

As schematically illustrated in FIG. 9A, the first coil 1010 can comprise a first inner periphery 1018 which bounds a first two-dimensional region 1019 (e.g., a hole) encircled by the first coil 1010 and the second coil 1020 can comprise a second inner periphery 1028 which bounds a second two-dimensional region 1029 (e.g., a hole) encircled by the second coil 1020. In certain embodiments, the material 1030 is substantially overlaying the first region 1019 and substantially overlaying the second region 1029. As used herein, the phrases "substantially overlaying the first region 1019" and "substantially overlaying the second region 1029" have their broadest reasonable interpretations, including but not limited to overlaying the entire first and second regions, respectively, and overlaying at least 90%, at least 95%, or at least 97% of the first and second regions, respectively. For example, the material 1030 can extend completely across the first region 1019 (e.g., in two orthogonal directions across the first two-dimensional region 1019) and can extend completely across the second region 1029 (e.g., in two orthogonal directions across the second two-dimensional region 1029). FIG. 9A schematically illustrates such an example in which the material 1030 extends across the entire first region 1019 in the two orthogonal directions, and the material 1030 extends across the entire second region 1029 in the two orthogonal directions. For another example, the material 1030 can comprise one or more orifices within the first region 1019 sized to allow one or more electrical conduits to be fed from one side of the material 1030 to the other through the first region 1019, such that the material 1030 extends across substantially the entire first region 1019 (e.g., extends across at least 90%, at least 95%, or at least 97% of the first region 1019). Similarly, the material 1030 can comprise one or more orifices within the second region 1029 sized to allow one or more electrical conduits to be fed from one side of the material 1030 to the other through the second region 1029, such that the material 1030 extends across substantially the entire second region 1029 (e.g., extends across at least 90%, at least 95%, or at least 97% of the second region 1029). The one or more orifices within the first region 1019 can have an area less than 3% of the area of the first region 1019, less than 5% of the area of the first region 1019, or less than 10% of the area of the first region 1019. The one or more orifices within the second region 1029 can have an area less than 3% of the area of the second region 1029, less than 5% of the area of the second region 1029, or less than 10% of the area of the second region 1029.

Figure 10:
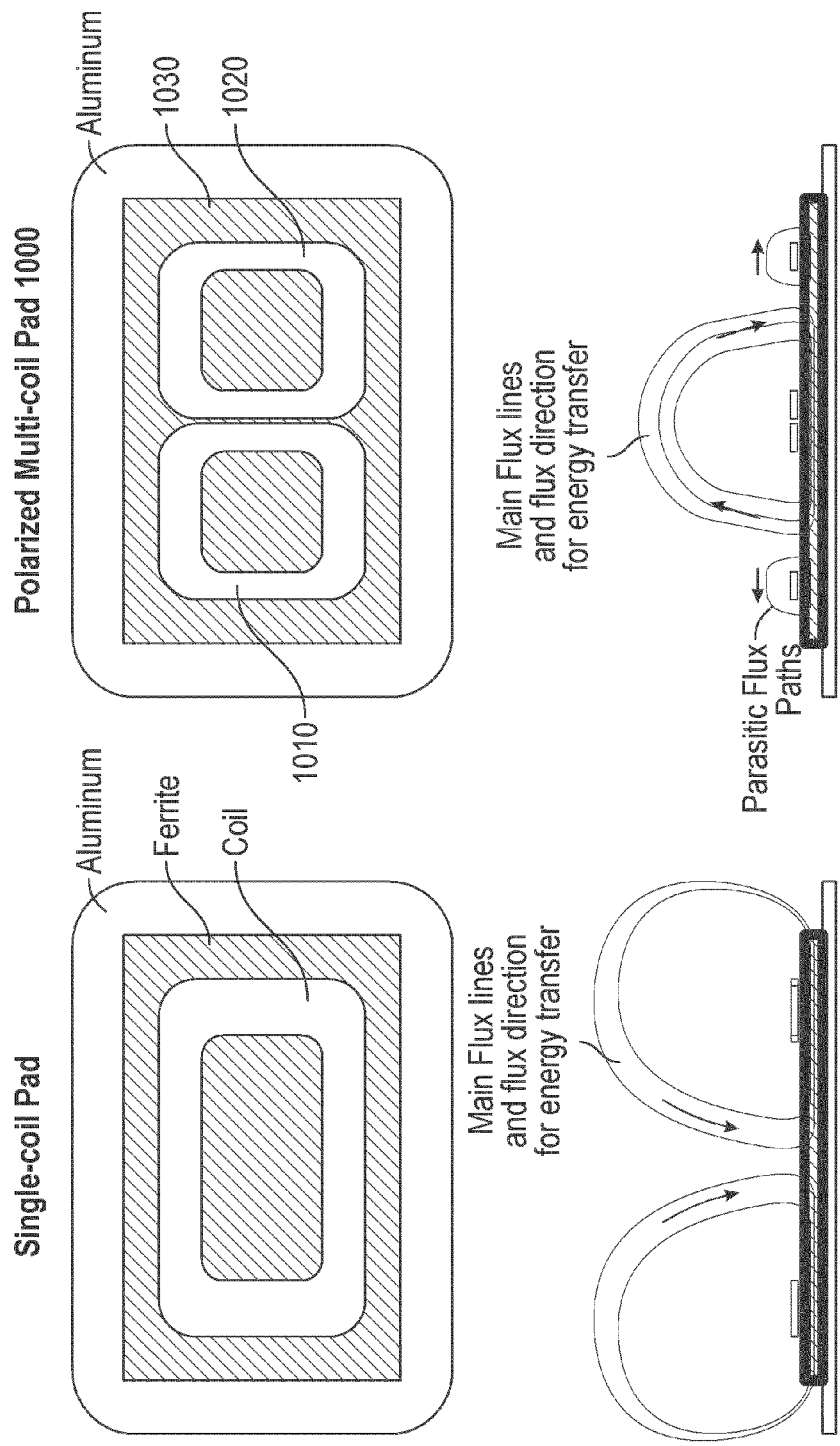
FIG. 10 schematically illustrates an example single-coil system in contrast to an example multi-coil device in accordance with certain embodiments described herein.

FIG. 10 schematically illustrates an example single-coil system in contrast to an example multi-coil device 1000 in accordance with certain embodiments described herein. In the example single-coil device, the single coil is above a ferrite plate which is above an aluminum shield. The ferrite plate in the single-coil device is used to avoid significant losses of the magnetic flux that would result from interactions of the main magnetic flux (e.g., the flux to be used for energy transfer) of the single coil with the aluminum shield. In the example polarized multi-coil device 1010, the first coil 1010 and the second coil 1020 are above the magnetically permeable material 1030 (e.g., a ferrite plate) which is above an aluminum shield. The example polarized multi-coil device 1000 can transfer power (e.g., to another device) with reasonable performance, even if the material 1030 does not completely collect the parasitic magnetic flux (e.g., there is no overlap of the material 1030 beyond the first and second coils 1010, 1020) and guides the main magnetic flux in the center from coil to coil. The overlap of the material 1030 beyond the first and second coils 1010, 1020, thus may not be rigorously required for the function of energy transfer. However, by including such overlap, the device 1000 can be configured to reduce unwanted magnetic flux emissions and losses (e.g., magnetic flux that does not contribute to energy transfer by the device 1000) using the "collecting" character of the material 1030.

Figure 11:
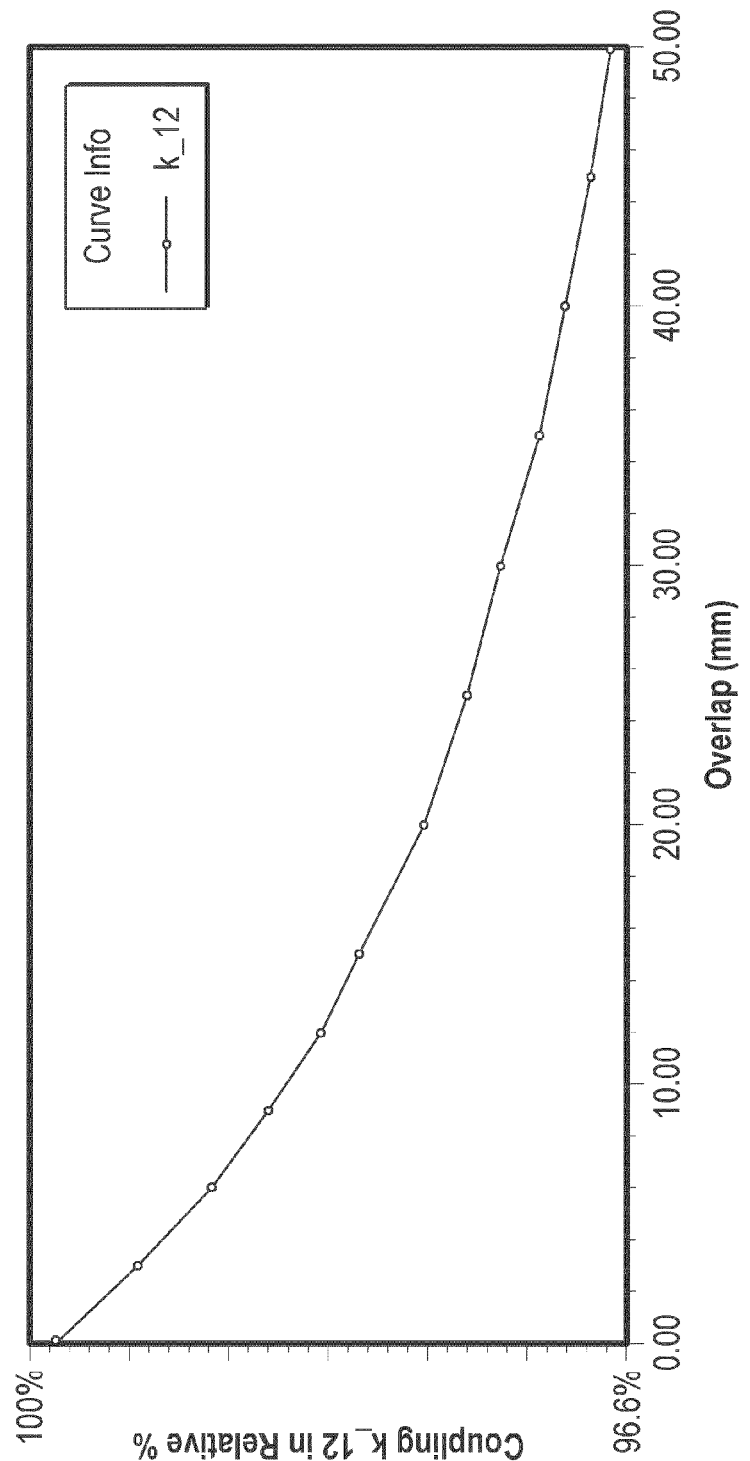
FIG. 11 shows the variation of the coupling factor $k_{12}$ between the device and the vehicle device versus the "overlap" dimension over a range of 0 mm to 50 mm.
Figure 12A:
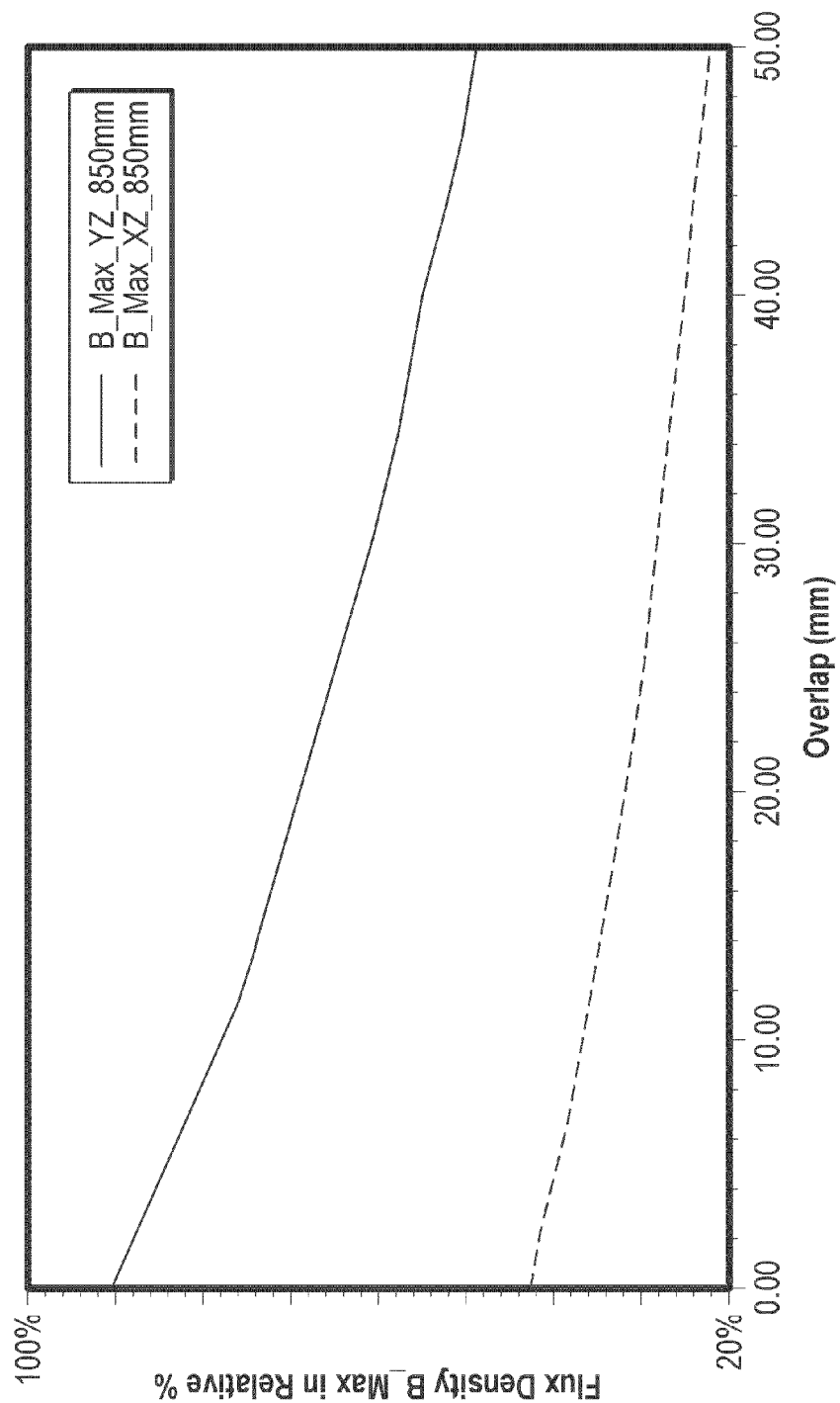
FIG. 12A shows the variation of the emissions versus the "overlap" dimension over a range of 0 mm to 50 mm.
Figure 12B:
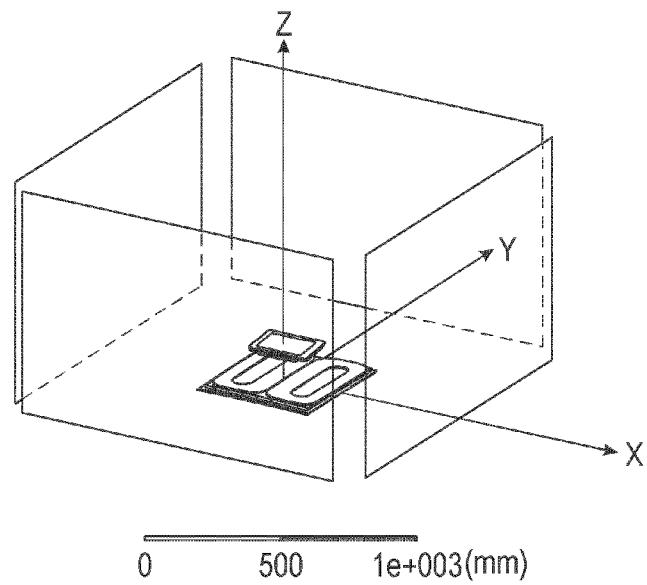
FIG. 12B shows the planes at which the emissions of FIG. 12A correspond.
Figure 12C:
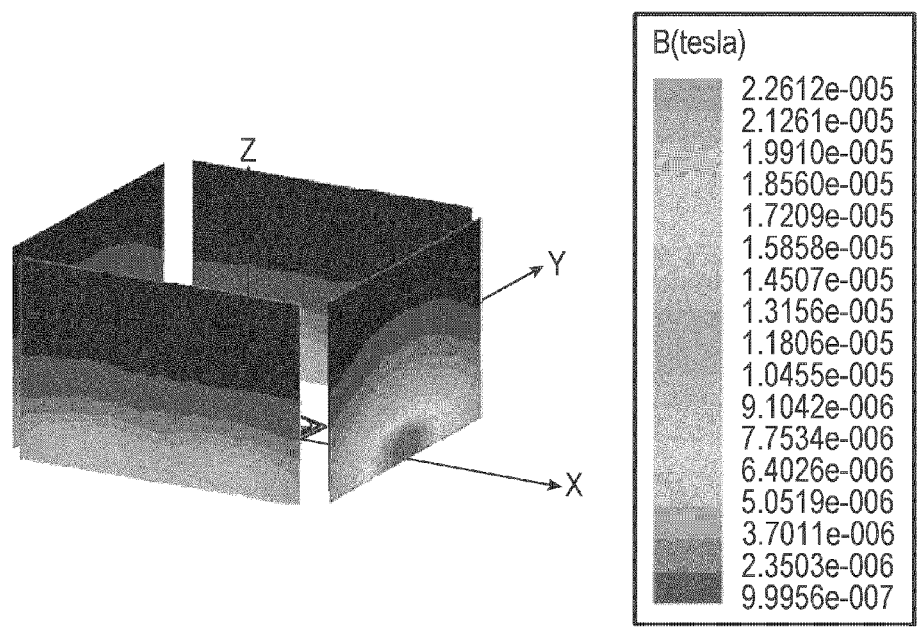
FIG. 12C shows the magnitude of the magnetic field across the planes of FIG. 12B.
Figure 13:
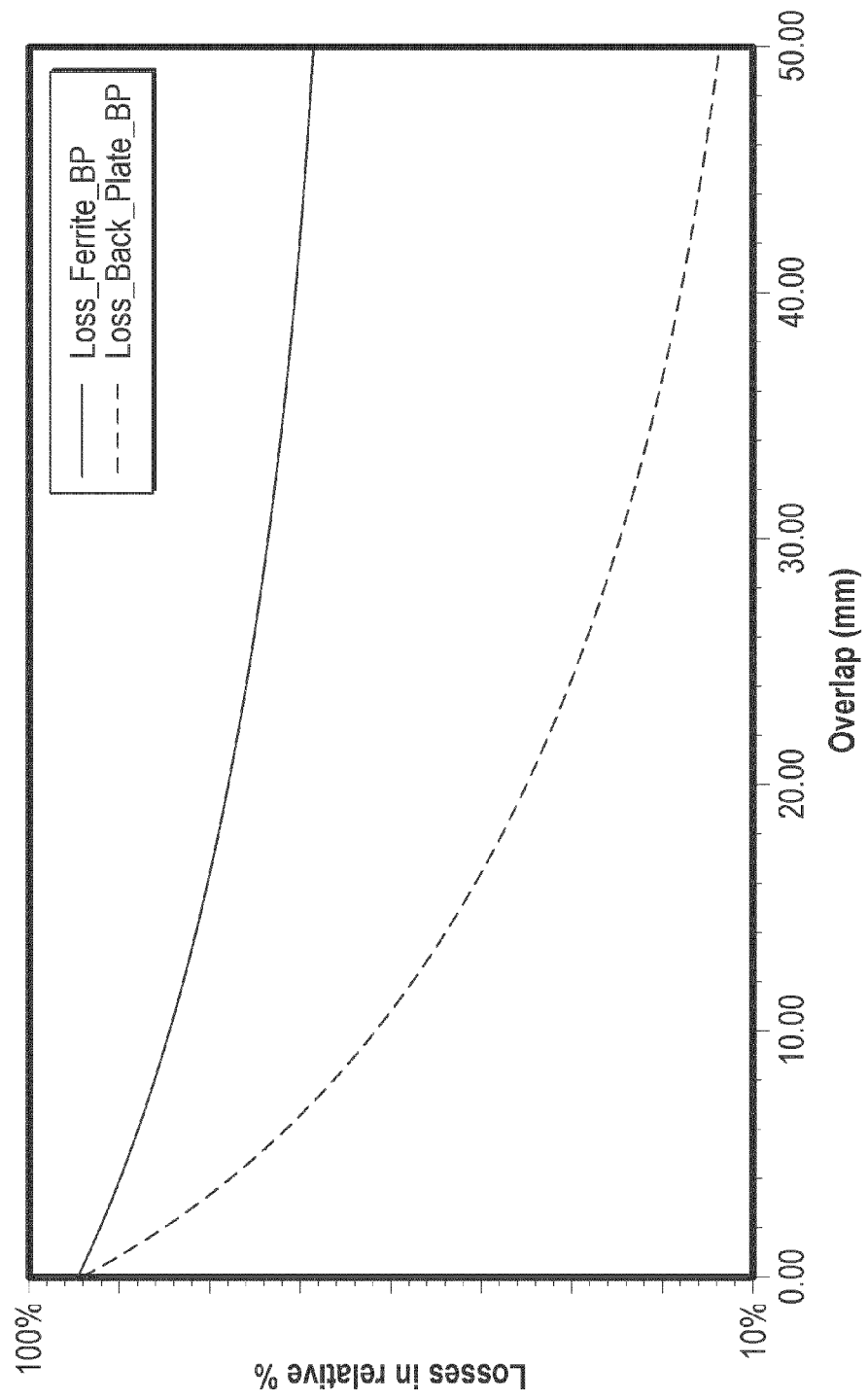
FIG. 13 shows the variation of the losses versus the "overlap" dimension over a range of 0 mm to 50 mm.

FIGS. 11-13 show some calculated results expected from a device 1000 in accordance with certain embodiments described herein. The calculations were performed based on a base pad with a "Double D" coil structure with overall dimensions of 550 mm×550 mm under a vehicle pad with a "DDQ" coil structure with overall dimensions of 250 mm×250 mm, with no offset between the base pad and the vehicle pad (e.g., the vehicle pad is centered over the base pad), and with the "overlap" dimension 1040 varied. The calculations of FIGS. 11-13 were performed by varying the dimensions of the device 1000 such that the outer dimension of the material 1030 equaled the summed outer dimension of the coils 1010, 1020 plus twice the "overlap" dimension 1040, with the outer dimensions of the shield and of the ferrite plate increased equally. The dimensions and specific values used in these calculations are only examples and should not be considered to be limiting.

FIG. 11 shows the variation of the coupling factor $k_{12}$ between the device 1000 and the vehicle device 1100 versus the "overlap" dimension 1040 over a range of 0 mm to 50 mm. The coupling coefficient exhibits only a small percentage of reduction for the "overlap" up to 50 mm. Thus, there is not a disadvantageous reduction of the coupling factor between the device 1000 and the vehicle device 1100 by increasing the size of the ferrite plate and the shield over the range of values plotted in FIG. 10.

FIG. 12A shows the variation of the emissions versus the "overlap" dimension 1040 over a range of 0 mm to 50 mm. The maximal flux density values plotted in FIG. 12A were modeled at a reference point on a plane oriented perpendicularly to the x-axis and 850 mm away from the center point of the device 1000 along the x-axis (labeled "B_max_yz_850 mm" in FIG. 12A) and at a reference point on a plane oriented perpendicularly to the y-axis and 850 mm away from the center point of the device 1000 along the y-axis (labeled "B_max_xz_850 mm" in FIG. 12A). These planes are shown in FIGS. 12B and 12C. FIG. 12C shows the magnitude of the magnetic field across these two planes. As shown by FIG. 12A, for "overlap" dimensions between 4 mm and 50 mm, there is a significant reduction of the emissions.

FIG. 13 shows the variation of the losses versus the "overlap" dimension 1040 over a range of 0 mm to 50 mm. The plotted losses are separated into two contributions: (i) magnetizing losses occurring in the material 1030 or ferrite plate of the device 1000 (denoted by "Loss_ferrite_BP"), and (ii) eddy current losses occurring in the shield or back plate of the device 1000 (denoted by "Loss_back_plate_BP"). As shown in FIG. 13, these losses have significant reductions in both the ferrite and the back plate.

As shown by these model calculations, upon increasing the size of the material 1030 (e.g., ferrite plate) and the shield back plate as compared to the sizes of the first coil 1010 and the second coil 1020, the coupling factor remains substantially unchanged (as do the inductances and the currents to be used for comparable power transfer), while the losses in the shield and the ferrite plate and the emissions are decreased significantly, with an increase of the overall efficiency. For example, using an "overlap" dimension of 50 mm, the losses in the shield can be reduced by up to 90%, the losses in the ferrite plate can be decreased by up to 35%, and the emissions everywhere can be reduced by up to 50%. Significant improvements can be obtained even without having the "overlap" dimension increased to 50 mm. For example, with an "overlap" dimension of 20 mm (corresponding to an increase of the overall size of the device 1000 by 40 mm in both the x-direction and the y-direction), the emissions can be reduced to 75%, and losses can be reduced to 55%.

In certain embodiments, the magnetic flux device comprises first means for transmitting magnetic flux or receiving magnetic flux (e.g., at least a first electrically conductive coil). The first means is substantially planar and has a first outer periphery bounding a first area. The magnetic flux device further comprises second means for transmitting magnetic flux or receiving magnetic flux (e.g., at least a second electrically conductive coil). The second means is substantially planar and has a second outer periphery bounding a second area. The second means is substantially coplanar with the first means. The magnetic flux device further comprises third means for affecting the magnetic flux transmitted or received by the first means and the second means (e.g., a magnetically permeable material). The third means has a substantially planar surface and has a third outer periphery bounding a third area. The first means and the second means are substantially parallel to the substantially planar surface, and the third area extends beyond and substantially surrounds the first area and the second area.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A magnetic flux device configured to transmit magnetic flux to or to receive magnetic flux from a space beyond the device, the device comprising:
   at least a first electrically conductive coil and a second electrically conductive coil, the first coil substantially planar, having a first inner periphery bounding a first region, and having a first outer periphery bounding a first area, the first outer periphery having at least one substantially straight first portion, the second coil substantially planar, having a second inner periphery bounding a second region, and having a second outer periphery bounding a second area, the second outer periphery having at least one substantially straight second portion, the second coil substantially coplanar with the first coil, the first coil having a first main coil radius equal to an average of a first inner coil radius of the first coil in a polarization direction of the device and a first outer coil radius of the first coil in the polarization direction of the device, the second coil having a second main coil radius equal to an average of a second inner coil radius of the second coil in the polarization direction of the device and a second outer coil radius of the second coil in the polarization direction of the device, the polarization direction of the device extending from a first center of the first coil to a second center of the second coil; and
   a ferromagnetic material having a substantially planar surface, a third outer periphery bounding a third area, and a device size between extreme portions of the third outer periphery, the first coil and the second coil substantially parallel to the substantially planar surface, the third area extending beyond the first area along the at least one substantially straight first portion by a first distance in a range between 5% of either the first main coil radius or the second main coil radius and 20% of the device size and beyond the second area along the at least one substantially straight second portion by a second distance in a range between 5% of either the first main coil radius or the second main coil radius and 20% of the device size, the ferromagnetic material substantially overlaying the first region and substantially overlaying the second region.

2. The magnetic flux device of claim 1, wherein the first coil is a spiral wound coil and the second coil is a spiral wound coil.

3. The magnetic flux device of claim 1, wherein the first outer periphery is adjacent to the second outer periphery, the first coil is adjacent to the ferromagnetic material, and the second coil is adjacent to the ferromagnetic material.

4. The magnetic flux device of claim 1, wherein the ferromagnetic material comprises a ferrite plate.

5. The magnetic flux device of claim 1, wherein the at least one substantially straight first portion extends along a first direction and the at least one substantially straight second portion extends along a second direction substantially parallel to the first direction.

6. The magnetic flux device of claim 1, wherein the third area extends beyond the first area in at least two directions perpendicular to one another and the third area extends beyond the second area in the at least two directions.

7. The magnetic flux device of claim 1, wherein the third area extends beyond the first area by a distance in a range between 4 millimeters and 50 millimeters or by a distance that is between 5% of the main coil radius of either the first coil or the second coil in the polarization direction of the device and 20% of the overall device size and the third area extends beyond the second area by a distance in a range between 4 millimeters and 50 millimeters or by a distance that is between 5% of the main coil radius of the first coil or the second coil in the polarization direction of the device and 20% of the overall device size.

8. The magnetic flux device of claim 1, wherein the ferromagnetic material extends across the entire first region in two orthogonal directions and extends across the entire second region in the two orthogonal directions.

9. The magnetic flux device of claim 1, wherein the third outer periphery is spaced from the first outer periphery and from the second outer periphery in at least two orthogonal directions substantially parallel to the first coil and the second coil by a distance in a range between 4 millimeters and 50 millimeters.

10. The magnetic flux device of claim 1, wherein the sum of the first area and the second area is less than the third area.

11. The magnetic flux device of claim 1, wherein the first coil is on a first half of the surface and the second coil is on a second half of the surface.

12. The magnetic flux device of claim 1, wherein an outer horizontal dimension of the sum of the first coil and the second coil is less than an outer horizontal dimension of the ferromagnetic material.

13. The magnetic flux device of claim 1, wherein the first coil and the second coil are in a polarized coil configuration.

14. The magnetic flux device of claim 1, wherein the ferromagnetic material is configured to reduce a portion of magnetic flux emission from the magnetic flux device that does not contribute to energy transfer by the magnetic flux device.

15. A magnetic flux device configured to transmit magnetic flux to or to receive magnetic flux from a space beyond the device, the device comprising:
   at least a first electrically conductive coil and a second electrically conductive coil, the first coil substantially planar and having a first outer periphery bounding a first area, the second coil substantially planar and having a second outer periphery bounding a second area, the second coil substantially coplanar with the first coil, the first coil having a first main coil radius equal to an average of a first inner coil radius of the first coil in a polarization direction of the device and a first outer coil radius of the first coil in the polarization direction of the device, the second coil having a second main coil radius equal to an average of a second inner coil radius of the second coil in the polarization direction of the device and a second outer coil radius of the second coil in the polarization direction of the device, the polarization direction of the device extending from a first center of the first coil to a second center of the second coil; and
   a ferromagnetic material having a substantially planar surface, a third outer periphery bounding a third area, and a device size between extreme portions of the third outer periphery, the first coil and the second coil substantially parallel to the substantially planar surface, the third area extending beyond the first area by a first distance in a range between 5% of either the first main coil radius or the second main coil radius and 20% of the device size and extending beyond the second area by a second distance in a range between 5% of either the first main coil radius or the second main coil radius and 20% of the device is, the third area substantially surrounding the first area and the second area.

16. The magnetic flux device of claim 15, wherein the third area extends beyond the first area and the second area by a distance in a range between 4 millimeters and 50 millimeters.

17. The magnetic flux device of claim 15, wherein the third outer periphery is spaced from the first outer periphery and from the second outer periphery by a distance in a range between 4 millimeters and 50 millimeters.

18. The magnetic flux device of claim 15, wherein the first coil and the second coil are in a polarized coil configuration.

19. The magnetic flux device of claim 15, wherein the ferromagnetic material is configured to reduce a portion of magnetic flux emission from the magnetic flux device that does not contribute to energy transfer by the magnetic flux device.

20. A method for wirelessly transferring power, the method comprising:
   using a magnetic flux device to transmit magnetic flux to or to receive magnetic flux from a space beyond the magnetic flux device, the magnetic flux device comprising at least a first electrically conductive coil, a second electrically conductive coil, and a ferromagnetic material, the first coil substantially planar, having a first inner periphery bounding a first region, and having a first outer periphery bounding a first area, the first outer periphery having at least one substantially straight first portion, the second coil substantially planar, having a second inner periphery bounding a second region, and having a second outer periphery bounding a second area, the second outer periphery having at least one substantially straight second portion, the second coil substantially coplanar with the first coil, the first coil having a first main coil radius equal to an average of a first inner coil radius of the first coil in a polarization direction of the device and a first outer coil radius of the first coil in the polarization direction of the device, the second coil having a second main coil radius equal to an average of a second inner coil radius of the second coil in the polarization direction of the device and a second outer coil radius of the second coil in the polarization direction of the device, the polarization direction of the device extending from a first center of the first coil to a second center of the second coil, the ferromagnetic material having a substantially planar surface, third outer periphery bounding a third area, and a device size between extreme portions of the third outer periphery, the first coil and the second coil substantially parallel to the substantially planar surface, the third area extending beyond the first area along the at least one substantially straight first portion by a first distance in a range between 5% of either the first main coil radius or the second main coil radius and 20% of the device size and beyond the second area along the at least one substantially straight second portion by a second distance in a range between 5% of either the first main coil radius or the second main coil radius and 20% of the device size, the ferromagnetic material substantially overlaying the first region and substantially overlaying the second region.

21. The method of claim 20, wherein the third area substantially surrounds the first area and the second area.

* * * * *